(12) United States Patent
Riedy (10) Patent No.: US 6,739,630 B2
(45) Date of Patent: May 25, 2004

(54) PIPE JOINT AND COUPLING (75) Inventor: Charles H. Riedy, Lakewood, OH (US)

(73) Assignee: The Lamson & Sessions Co., Cleveland, OH (US)

( * ) Notice: Subject to any disclaimer, the term of this patent is extended or adjusted under 35 U.S.C. 154(b) by 0 days.

(21) Appl. No.: 10/167,623

(22) Filed: Jun. 12, 2002

(65) Prior Publication Data

US 2003/0230896 A1 Dec. 18, 2003

(51) Int. Cl.$^7$ ................................ F16L 21/00
(52) U.S. Cl. ................................ 285/321; 285/305
(58) Field of Search ................ 285/305, 321, 285/330, 913

(56) References Cited

U.S. PATENT DOCUMENTS

| | | | | |
|---|---|---|---|---|
| 2,458,714 A | * | 1/1949 | Mahoney | 285/305 |
| 2,597,482 A | | 5/1952 | Harrison et al. | |
| 2,839,218 A | | 6/1958 | Zerbe | |
| 3,181,897 A | | 5/1965 | Krayenbuhl et al. | |
| 3,334,929 A | | 8/1967 | Wiltse | |
| 3,422,630 A | | 1/1969 | Marier | |
| 3,606,402 A | | 9/1971 | Medney | |
| 3,759,553 A | | 9/1973 | Carter | |
| 3,759,554 A | | 9/1973 | Carter | |
| 3,860,742 A | * | 1/1975 | Medney | 285/305 |
| 3,887,222 A | * | 6/1975 | Hammond | 285/321 |
| 4,269,436 A | | 5/1981 | Medney | |
| 4,396,210 A | | 8/1983 | Spencer, III et al. | |
| 4,427,221 A | | 1/1984 | Shay, Jr. | |
| 4,498,874 A | * | 2/1985 | Pichl | 285/305 |
| 4,679,825 A | | 7/1987 | Taylor | |
| 4,697,947 A | | 10/1987 | Bauer et al. | |
| 4,749,192 A | * | 6/1988 | Howeth | 285/305 |
| 4,811,975 A | * | 3/1989 | Paul et al. | 285/305 |
| 4,817,996 A | * | 4/1989 | Fouts | 285/305 |
| 4,894,156 A | * | 1/1990 | Murken | 285/305 |
| 4,927,192 A | | 5/1990 | Ungchusri et al. | |
| 5,052,404 A | | 10/1991 | Hodgson | |
| 5,083,820 A | | 1/1992 | Hopperdietzel | |
| 5,165,832 A | | 11/1992 | Dimov | |
| 5,178,216 A | | 1/1993 | Giroux et al. | |
| 5,255,945 A | | 10/1993 | Toon | |
| 5,383,694 A | * | 1/1995 | Taeuber, et al. | 285/321 |
| 5,443,580 A | * | 8/1995 | Cotter | 285/305 |
| 5,509,699 A | | 4/1996 | Himmelberger | |
| 5,573,279 A | | 11/1996 | Rea et al. | |
| 5,743,333 A | * | 4/1998 | Willauer et al. | 285/305 |
| 5,813,705 A | | 9/1998 | Dole | |
| 5,868,443 A | | 2/1999 | Ungerman et al. | |
| 6,086,297 A | | 7/2000 | Lotfi | |
| 6,179,347 B1 | * | 1/2001 | Dole et al. | 285/321 |
| 6,325,424 B1 | | 12/2001 | Metcalfe et al. | |
| 6,343,813 B1 | * | 2/2002 | Olson et al. | 285/305 |

FOREIGN PATENT DOCUMENTS

| | | |
|---|---|---|
| AU | 225666 | 4/1959 |
| FR | 1310712 | 10/1961 |
| FR | 1397378 | 3/1964 |
| WO | WO 99/40355 | 8/1999 |

* cited by examiner

*Primary Examiner*—David Bochna
(74) *Attorney, Agent, or Firm*—Jones Day (57) ABSTRACT

A coupling member has an internally threaded end portion and an opposite socket end portion with a pair of axially-spaced internal circumferential grooves. The internally threaded end portion receives an externally threaded end portion on a pipe, while the opposite socket end portion receives an end portion of another pipe that has an external circumferential groove aligned with one of the pair of internal grooves. A spline is inserted into the aligned grooves through a transverse hole in the wall of the opposite end portion of the coupling member to hold the coupling member and the other pipe against relative axial movement. The spline is a wire rope to provide high shear strength.

29 Claims, 7 Drawing Sheets

PIPE JOINT AND COUPLING

BACKGROUND OF THE INVENTION

This application relates to the art of pipe joints and, more particularly, to pipe joints that use a coupling member for joining together end portions on a pair of pipes. The invention is particularly applicable for use in connecting metal pipes and will be described with particular reference thereto. However, it will be appreciated that the invention has broader aspects and that certain features thereof may be used with other types of pipe.

SUMMARY OF THE INVENTION

A pipe joint includes a coupling member having an internally threaded first end portion and an opposite end portion with a pair of axially-spaced internal circumferential grooves therein. An internal shoulder within the opposite end portion is spaced toward the internally threaded end portion from the pair of internal grooves. The internal groove that is closest to the shoulder is a sealing ring groove and the other groove is a spline receiving groove.

The coupling member is used with cylindrical pipe having an externally threaded first end portion and an opposite second end portion with an external circumferential groove therein. The threaded end portion of a pipe is received within the internally threaded end portion of the coupling member. The opposite second end portion of another pipe is received within the opposite end portion of the coupling member. The spline receiving external groove in the pipe end portion is aligned with the internal spline receiving groove in the coupling member, and a spline is inserted therein through a transverse hole in the coupling member to lock the second pipe end portion within the coupling member.

The flexible spline advantageously may be a flexible shaft having at least one layer of helically coiled metal wire. This type of spline provides the flexibility required for insertion into the aligned grooves in the pipe and coupling while providing high shear strength to maintain joint integrity and joint strength.

External indicia is provided on the second end portion of the pipe for indicating when the pipe end portion is fully seated within the coupling member to insure that the spline receiving grooves are aligned.

It is a principal object of the present invention to provide an improved coupling member for joining together end portions of a pair of pipes.

It is an additional object of the invention to provide an improved joint between a pair of pipes.

It is a further object of the invention to provide an improved metal pipe joint that uses a flexible metal spline having high shear strength.

It is another object of the invention to provide a pipe joint and coupling member that are relatively economical and easy to manufacture and assemble.

DESCRIPTION OF A REPRESENTATIVE EMBODIMENT

Figure 1:
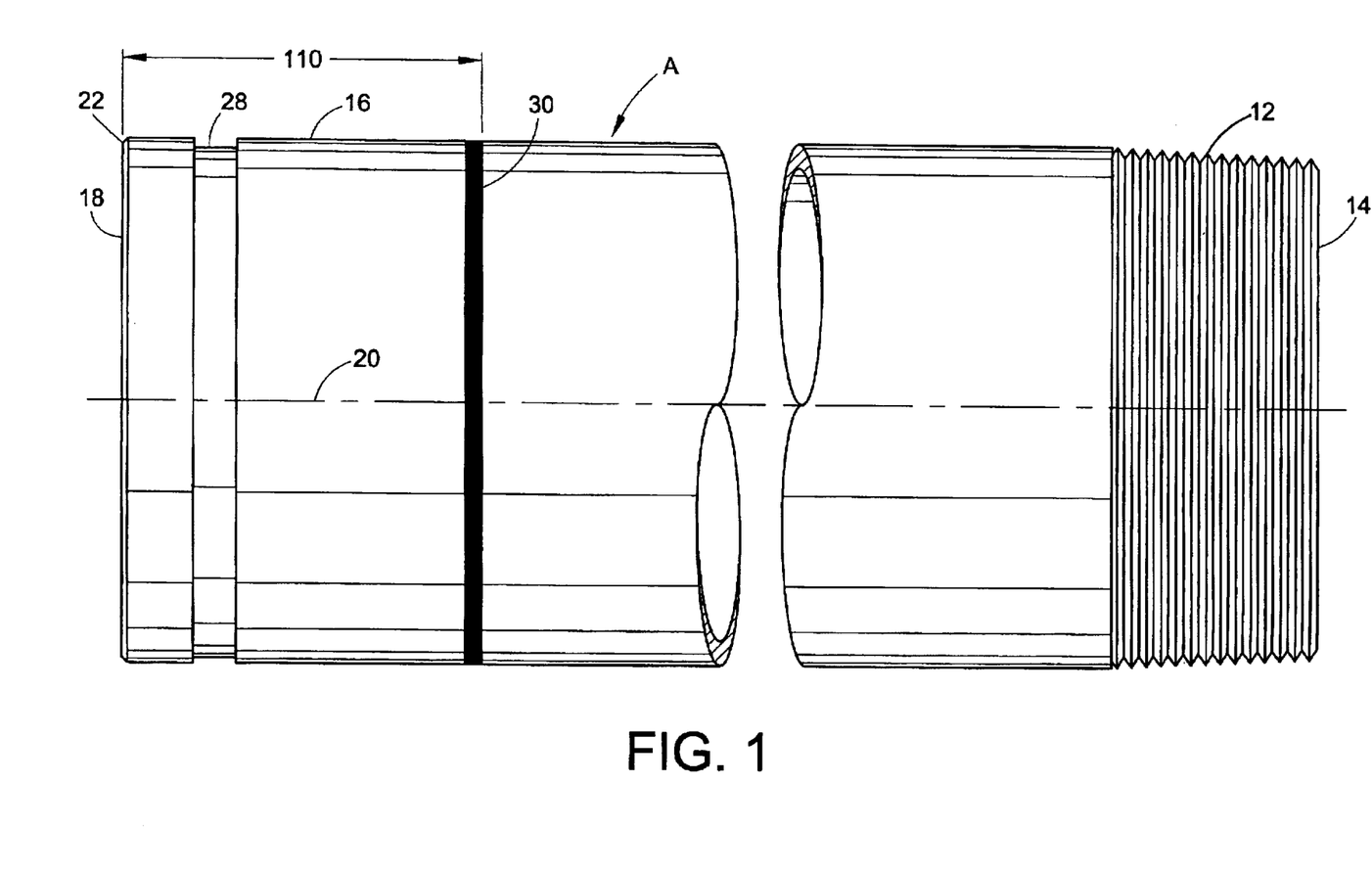
FIG. 1 is a side elevational view of a pipe used in the joint of the present application.

Referring now to the drawing, wherein the showings are for purposes of illustrating a representative embodiment of the invention only and not for purposes of limiting same, FIG. 1 shows a hollow cylindrical pipe A having an externally threaded first end portion 12 that terminates in a first end 14. An opposite second pipe end portion 16 terminates at a second pipe end 18 having a flat surface extending radially of pipe longitudinal axis 20. An external chamfer 22 extends between flat second pipe end 18 and the external surface of second pipe end portion 16.

An external circumferential spline receiving groove 28 is provided in second pipe end portion 16 in axially-spaced relationship to second pipe end 18. Although other groove shapes are possible, a preferred cross-sectional shape is rectangular as illustrated in the drawing.

Indicia is provided on the external surface on pipe A for indicating when second pipe end portion 16 is fully received within a coupling member to insure that spline receiving grooves on the coupling member and on a pipe are aligned. In the arrangement shown, the indicia comprises a circumferential band 30 that may be a different color than the color of the pipe or may be etched into the external surface of the pipe.

Figure 2:
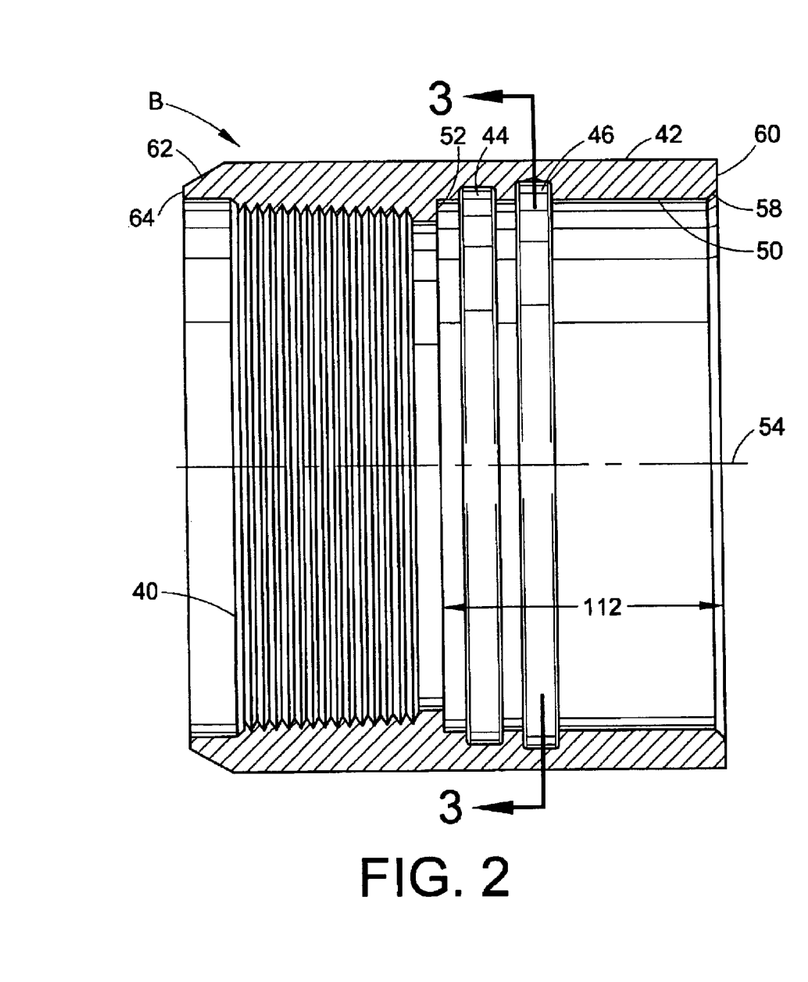
FIG. 2 is a cross-sectional elevational view of a coupling member in accordance with the present application.

FIG. 2 shows a hollow cylindrical coupling member B having an internally threaded first end portion 40 and an opposite second end portion 42 with a pair of axially-spaced internal circumferential grooves 44, 46 therein. The interior of second end portion 42 provides an internal cylindrical socket 50 with internal grooves 44, 46 therein.

A shoulder 52 extends radially of coupling member longitudinal axis 54 and defines the bottom of socket 50. An internal chamfer 58 extends between socket 50 and flat radial end 60 on second end portion 42 of coupling member B. First coupling end portion 40 is provided with an external chamfer 62 extending between the outer surface thereof and coupling member first end 64.

Figure 3:
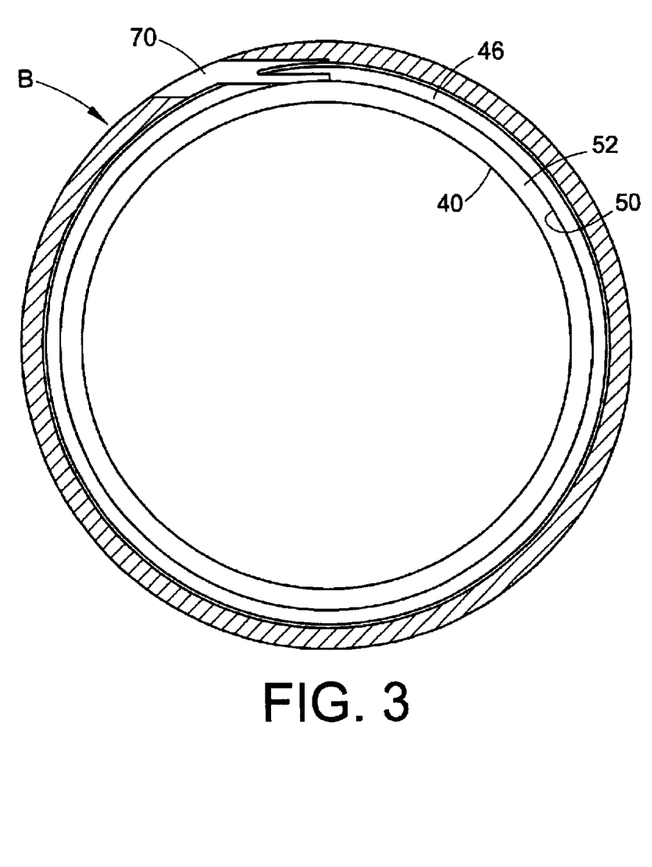
FIG. 3 is a cross-sectional elevational view taken generally on line 3—3 of FIG. 2.

FIG. 3 shows a transverse hole 70 through the wall of coupling member B in alignment with internal spline receiving groove 46. Hole 70 extends generally tangential to internal spline receiving groove 46 so that a flexible spline may be pushed through hole 70 into spline receiving groove 46.

Figure 6:
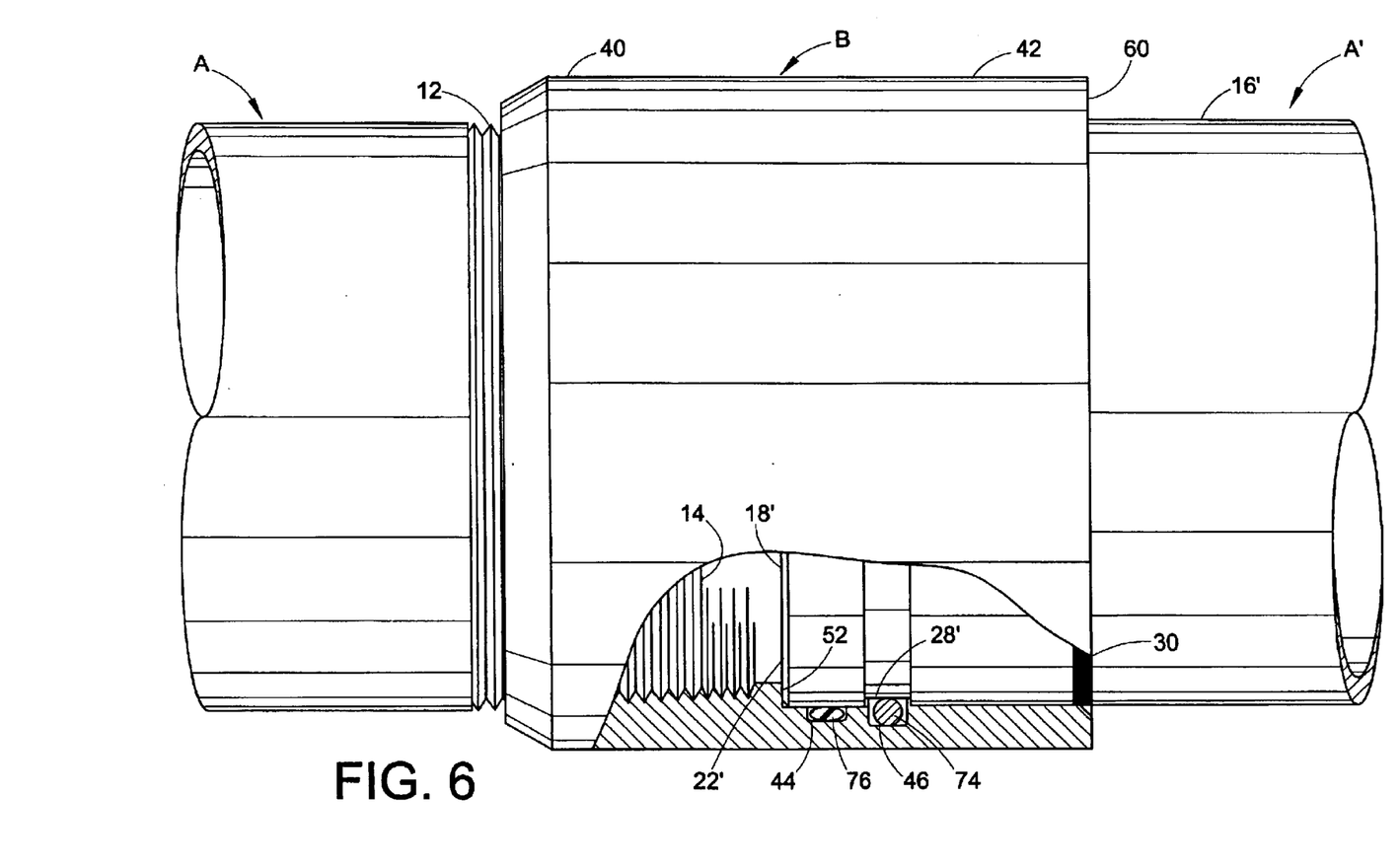
FIG. 6 is a side elevational view of a pair of pipes joined together by the coupling member, and with portions cutaway and in section for clarity of illustration.

FIG. 6 shows an externally threaded first end portion on one pipe A received within the internally threaded end portion of coupling member B, while an end portion 16' of another pipe A' is received within the coupling member socket. The external groove 28' in pipe A' is aligned with spline receiving groove 46 within coupling member B so that a spline inserted through hole 70 in coupling member B occupies both of the spline receiving grooves to prevent axial displacement of pipe A' and coupling member B. The spline is generally indicated at 74 and may be a conventional flexible wire rope. In the alternative, the spline may be formed by winding a wire into a closed coil similar to a speedometer cable or flexible drive shaft so that it has flexibility to conform to the cylindrical shape of the passage formed by the aligned grooves as it is inserted through hole 70. Obviously, other types of splines may be used when the joint does not require a wire rope or to meet other requirements.

The diameter of the cable is much greater than the depth of either groove, and is nearly as great as the combined depth of both aligned grooves so that the spline essentially occupies the depth of both grooves. Obviously, the diameter is sufficiently smaller than the combined groove depth to facilitate insertion of the spline.

An elastomeric sealing ring 76 is received within internal sealing ring groove 44. The sealing ring preferably is positioned within groove 44 prior to insertion of pipe A' into socket 50. Chamfer 22' on pipe end portion 16' facilitates movement of the pipe end past sealing ring 76. The sealing ring seals against the external surface of the pipe between spline receiving groove 28' and pipe second end 18'.

Figure 4:
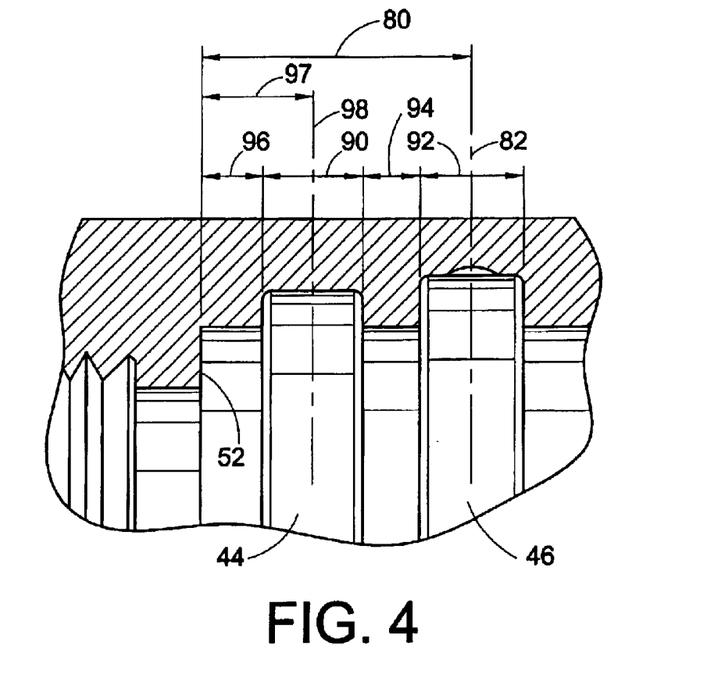
FIG. 4 is a partial cross-sectional elevational view showing the relationship between a shoulder and a pair of internal grooves within the coupling member.
Figure 5:
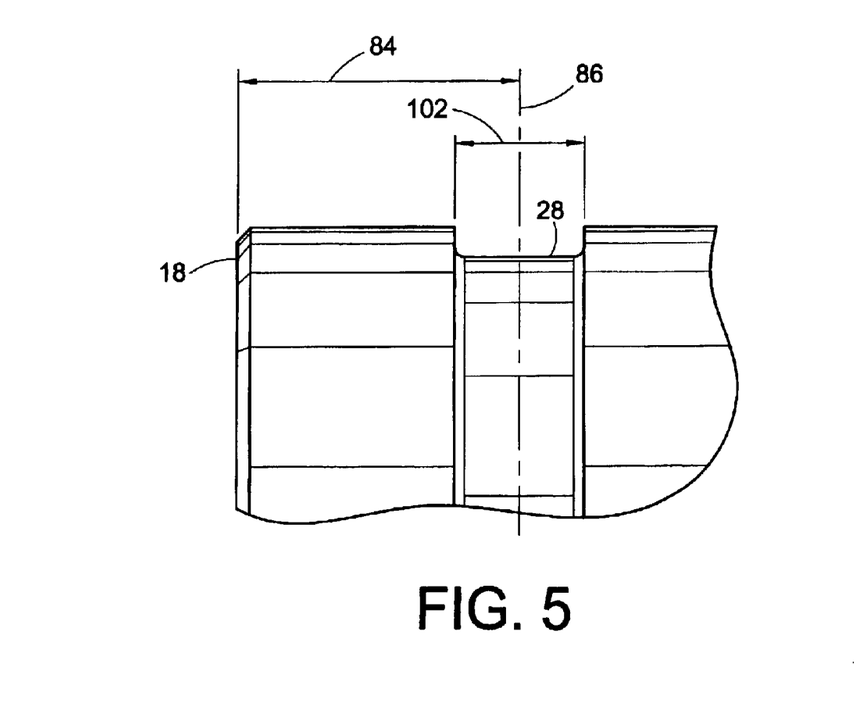
FIG. 5 is a side elevational view showing the external spline receiving groove in an end portion of the pipe.

The axial distance from internal shoulder 52 to spline receiving groove 46, and the axial distance from pipe first end 18 to external spline receiving groove 28, are such that the center lines of grooves 28 and 46 are aligned when pipe end 18 engages shoulder 52. This relationship is illustrated in FIGS. 4 and 5 where distance 80 from internal shoulder 52 to center line 82 of internal spline receiving groove 46 is approximately the same as distance 84 from pipe end 18 to center line 86 of external spline receiving groove 28. Each coupling internal groove 44, 46 has an axial width 90, 92 that is approximately the same. Spacing 94 between adjacent grooves 44, 46 preferably is not greater than the distance 96 from shoulder 52 to sealing ring groove 44, and also is less than the width of each groove.

In coupling member B, the internal diameter of internally threaded end portion 40 is less than the internal diameter of socket 50 in the opposite end portion thereof. The distance 80 between coupling shoulder 52 and centerline 82 of spline receiving groove 46 is less than the distance between centerline 82 and second coupling end 60. The distance between spline receiving groove centerline 82 and second coupling end 60 preferably is at least one and one-half times the distance 80 between coupling shoulder 52 and centerline 82 and, in one arrangement has been approximately 190% of distance 80.

Distance 80 between shoulder 52 and spline groove centerline 82 is at least two times the distance 97 between shoulder 52 and sealing groove centerline 98 and, in one arrangement, has been made approximately 240% of distance 97. Although other arrangements are possible for some purposes, distance 80 preferably is not greater than three times distance 97 so that distance 80 always would be between two and three times distance 97.

The distance between sealing groove centerline 98 and second coupling end 60 preferably is at least five times the distance 97 between shoulder 52 and sealing groove centerline 98 and, in one arrangement, has been made to be approximately six times distance 97.

External spline receiving pipe groove 28 preferably has a width 102 that is greater than width 92 of internal spline receiving groove 46 to accommodate some misalignment and allow for tolerances. Even though centerlines 82, 86 of spline receiving grooves 46, 28 are out of alignment, this makes it possible to have the spline fit into the two grooves. Groove 28 may be around 10–35% wider than groove 46 and, in one arrangement, has been made to be within 10% of being 25% larger than groove 46.

The depth of internal spline receiving groove 46 in coupling member B is greater than the depth of sealing ring groove 44. Thus, the diameter of groove 46 across the flat bottom thereof is greater than the diameter across the flat bottom of groove 44. In one arrangement, the diameter of groove 46 has been around 2–3% larger than the diameter of groove 44.

The depth of coupling spline receiving groove 46 also is greater than the depth of pipe spline receiving groove 28. By way of example, the depth of coupling spline receiving groove 46 may be around 65–100% greater than the depth of pipe spline receiving groove 28.

All of the grooves preferably have a generally rectangular cross-sectional shape as illustrated, although other shapes are possible.

Distance 110 in FIG. 1 from pipe end 18 to the far side of indicia band 30 is approximately the same as distance 112 in FIG. 2 from shoulder 52 to coupling end 60 so that indicia band 30 essentially disappears within socket 50 when second pipe end portion 16 is fully received within socket 50. Indicia band 30 may be considered to cooperate with second coupling end 60 to indicate whether the pipe end portion is fully seated within the coupling socket.

Although different types of splines may be used in the joint of the present application, a flexible spline of flexible wire rope advantageously is employed to provide high shear strength for maintaining joint integrity and strength.

Figure 7:
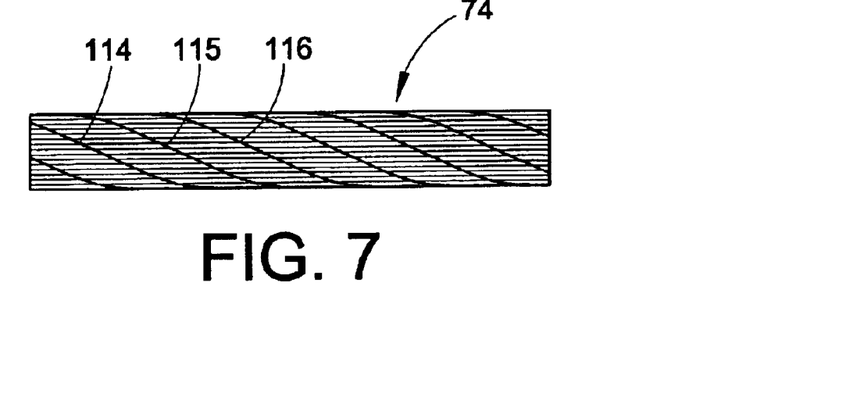
FIG. 7 is an elevational view of a wire rope spline used in the joint of the present application.
Figure 8:
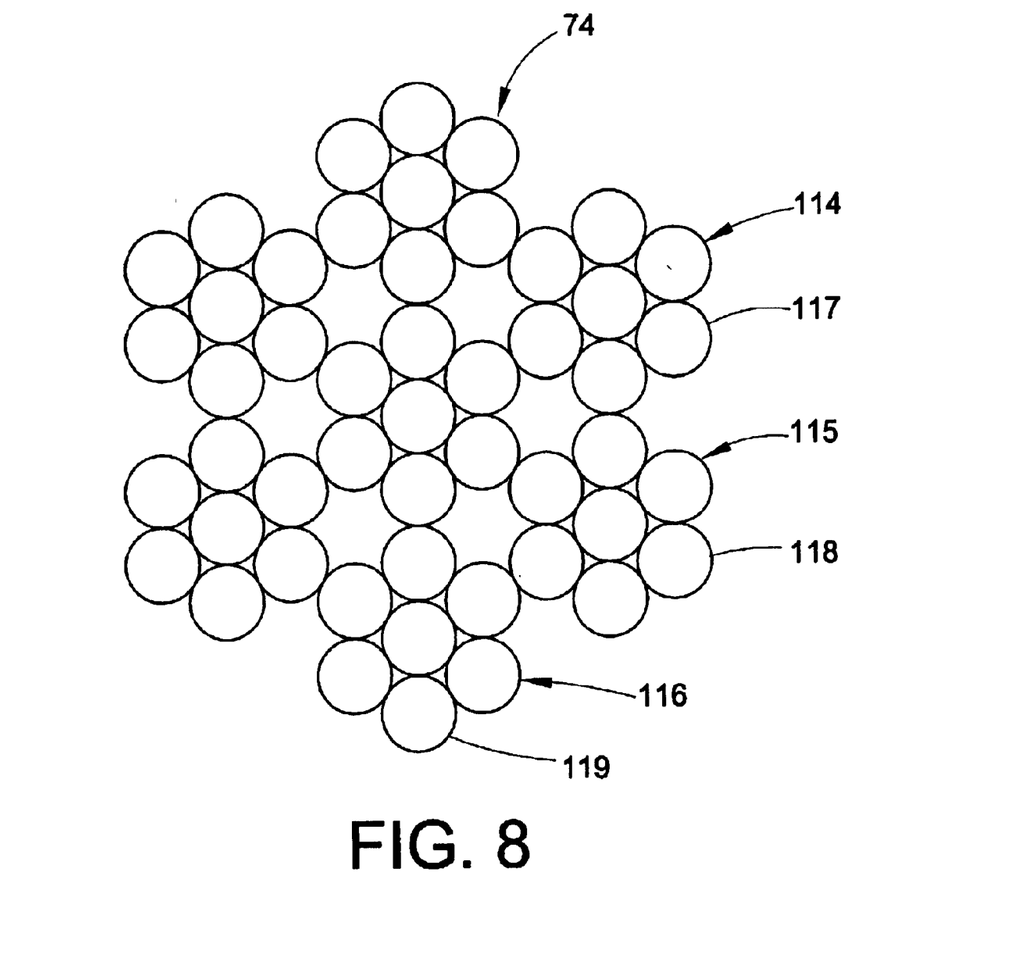
FIG. 8 is a cross-sectional elevational view of an example of a wire rope for use as a spline in the joint of the present application.

FIGS. 7 & 8 show flexible wire rope spline 74 formed by a plurality of individual strands that are twisted together, only three of such strands being referenced by numbers 114, 115 and 116, and only one individual wire in each strand being identified by numbers 117, 118 and 119. The individual wires in each strand are twisted together in a known manner.

The wire rope used for the spline preferably is galvanized steel wire, although it will be recognized that other materials can be used. The wire rope may include non-metallic materials as part of the core or in individual strands, and the wire rope may be coated with plastic material such as PVC or a polyamide. The wire rope is flame cut to the length necessary to fill the entire circumference of the spline receiving groove. Flame cutting welds the strands and wires together at the cut to prevent fraying or unraveling. The wire rope preferably has a generally circular cross-sectional shape, although other shapes are possible.

The wire rope may take many forms, and is of the type frequently referred to inaccurately as cable. Suitable wire rope for use as the spline is available from such suppliers as metro Wire Rope Corporation and Wire Rope Industries.

Figure 9:
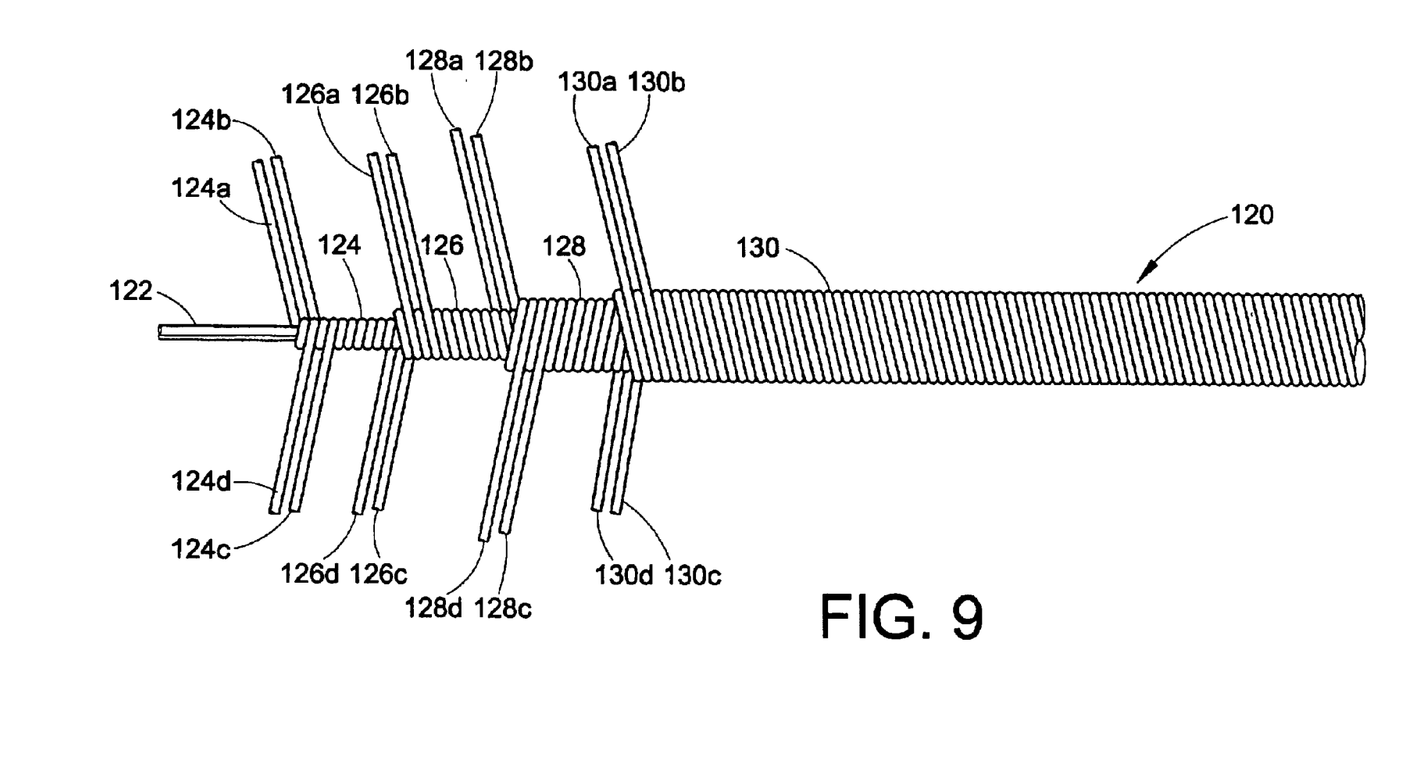
FIG. 9 is a side elevational view of a flexible spline used in the joint of the present application.
Figure 10:
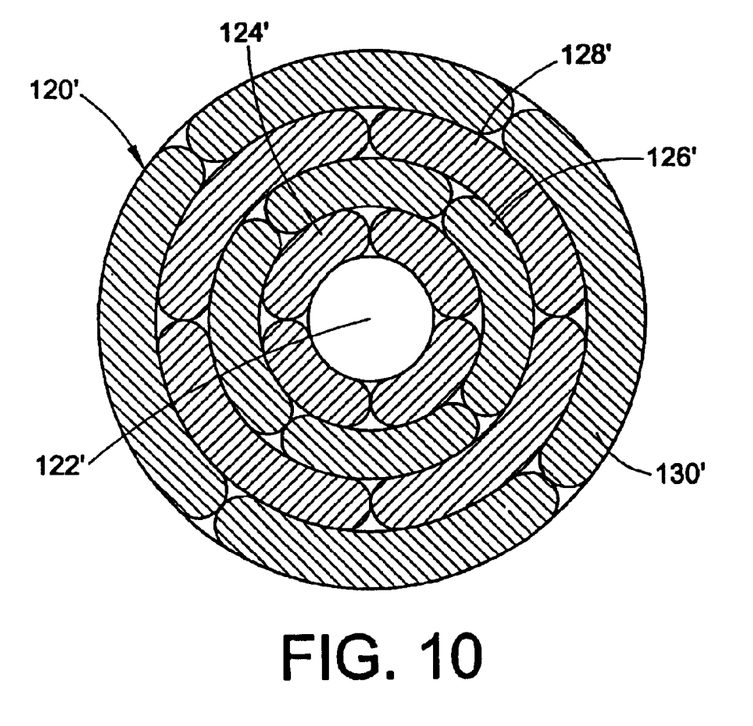
FIG. 10 is a cross-sectional elevational view of the spline of FIG. 9 with the solid central core omitted to illustrate a hollow core.

An alternative spline material is flexible shafting of the type marketed by Suhner Manufacturing. This type of flexible shafting includes several layers of helically wound wire, with alternate layers being wound in opposite directions. An example of such a flexible spline is shown in FIG. 9 where spline 120 has a solid wire core 122 and helically wound wire layers 124, 126, 128 and 130. Each succeeding layer is wound in the opposite direction from the preceding layer. Each layer is formed by winding wires as indicated at 124a–124d, 126a–126d, 128a–128d and 130a–130d. The wires preferably have circular cross-sectional shapes, although other shapes can be used. The wire preferably is high carbon steel or stainless steel, although other metals and materials can be used where the high shear strength of steel is not required. Although the spline illustrated in FIG. 9 has a solid core, it will be recognized that the use of a hollow core also is possible as shown in FIG. 10 where spline 120' has a hollow core 122' that is surrounded by helically wound wire layers 124', 126', 128' and 130'. The principal characteristic of this type of flexible spline is that it has at least one layer of helically wound wire and, more preferably, has a plurality of layers of helically wound wire.

Examples of flexible shafts other than the Suhner shafts that could be used are found in the following U.S. patents, the disclosures of which are hereby incorporated herein by reference: U.S. Pat. Nos. 177,490; 779,374; 1,905,197; 3,000,197; and 5,052,404.

The joint and coupling of the present application are particularly suited for use with metal pipe using a metal coupling member. However, it will be recognized that features of the application may be used with pipes or coupling members made of other materials.

Although the invention has been shown and described with reference to a representative embodiment, it is obvious that alterations and modifications will occur to others skilled in the art upon the reading and understanding of this application. Therefore, it is to be understood that the invention may be practiced otherwise than as specifically described herein while remaining within the scope of the claims.

I claim:

1. A pipe joint between a pair of cylindrical pipes comprising:
    a pair of elongated cylindrical pipes, each pipe having an externally threaded end portion and an externally unthreaded opposite spigot end portion;
    a cylindrical coupling member having an internally threaded first end portion;
    said coupling member having a second end portion with an internal shoulder and a pair of axially-spaced internal circumferential grooves therein;
    said internal grooves including an internal sealing ring groove adjacent said shoulder and an internal spline receiving groove on the opposite side of said sealing ring groove from said shoulder;
    a transverse spline receiving opening through said second end portion of said coupling member in alignment with said internal spline receiving groove;
    said externally threaded end portion on a first one of said pair of pipes being threadably received in said internally threaded first end portion of said coupling member;
    said spigot end portion on a second one of said pair of pipes being received in said second end portion of said coupling member;
    said spigot end portion having a circumferential external spline receiving groove aligned with said internal spline receiving groove in said coupling member;
    a sealing ring received in said internal circumferential sealing ring groove and being in sealing engagement with said spigot end portion; and
    a spline received in said aligned internal and external spline receiving grooves through said spline receiving opening to inhibit relative longitudinal movement between said spigot end portion and said coupling member.

2. The joint of claim 1 wherein all of said grooves are generally rectangular in cross section.

3. The joint of claim 1 wherein said internal spline receiving groove in said coupling member has a depth that is at least 65% greater than the depth of said external spline receiving groove in said spigot end portion of said pipe.

4. The joint of claim 1 wherein said internal spline receiving groove in said coupling member has a depth greater than the depth of said external spline receiving groove in said spigot end portion of said pipe, and one of said spline receiving grooves has a width axially of said pipe and coupling member that is greater than the width of the other of said spline receiving grooves axially of said pipe and coupling member.

5. The joint of claim 1 wherein said internal sealing ring groove has a sealing ring groove width axially of said coupling member and the distance from said shoulder to said internal sealing ring groove axially of said coupling member is less than said sealing ring groove width.

6. The joint of claim 1 wherein the spacing between said internal sealing ring and spline receiving grooves is not greater than the distance between said shoulder and said internal sealing ring groove.

7. The joint of claim 1 wherein said first end portion of said coupling member has a first end and said second end portion of said coupling member has a second end, the distance between said shoulder and said first end being less than the distance between said shoulder and said second end.

8. The joint of claim 1 wherein said second end portion of said coupling member has a second end and said spline receiving groove has a spline groove centerline, the distance between said shoulder and said spline groove centerline being less than the distance between said spline groove centerline and said second end.

9. The joint of claim 8 wherein the distance between said spline groove centerline and said second end is at least one and one-half times the distance between said spline groove centerline and said shoulder.

10. The joint of claim 1 wherein said second end portion of said coupling member has a coupling second end, said spigot end portion of said second pipe having indicia thereon cooperating with said coupling second end to indicate whether said spigot end portion is fully received within said coupling second end portion, and said indicia being a band of a different color than said pipe or being etched into said pipe.

11. The joint of claim 1 wherein said internal and external spline receiving grooves have generally rectangular cross-sectional shapes, and said internal spline receiving groove in said coupling member has a depth greater than the depth of said external spline receiving groove in said spigot end portion of said pipe.

12. The joint of claim 11 wherein said depth of said internal spline receiving groove in said coupling member is 65–100% greater than the depth of said external spline receiving groove in said spigot end portion of said pipe.

13. The joint of claim 11 wherein said spline is a wire rope.

14. The joint of claim 13 wherein said wire rope has a generally circular cross-sectional shape.

15. The joint of claim 11 wherein said spline includes at least one layer of helically wound metal wire.

16. The joint of claim 15 wherein said spline includes a plurality of layers of helically wound metal wire.

17. The joint of claim 15 wherein said spline has a solid core.

18. The joint of claim 15 wherein said spline has a hollow core.

19. The joint of claim 15 wherein said wire has a circular cross sectional shape.

20. A coupling for joining together a pair of pipe end portions comprising:
    a cylindrical coupling member having an internally threaded first end portion;
    said coupling member having a second end portion with an internal shoulder and a pair of axially-spaced internal circumferential grooves therein;
    said first end portion having a first end and said second end portion having a second end, the distance between said shoulder and said first end being less than the distance between said shoulder and said second end;
    said internal grooves including an internal sealing ring groove adjacent said shoulder and an internal spline receiving groove on the opposite side of said sealing ring groove from said shoulder;

said spline receiving groove having a spline groove centerline, the distance between said shoulder and said spline groove centerline being not greater than the distance between said spline groove centerline and said second end; and a transverse spline receiving opening through said second end portion of said coupling member in alignment with said internal circumferential groove.

21. The coupling of claim 20 wherein all of said grooves are generally rectangular in cross section.

22. The coupling of claim 20 wherein said internal sealing ring groove has a sealing ring groove width and the distance from said shoulder to said internal sealing ring groove is less than said sealing ring groove width.

23. The coupling of claim 20 wherein the spacing between said internal sealing ring and spline receiving grooves is not greater than the distance between said shoulder and said internal sealing ring groove.

24. The coupling of claim 20 wherein the distance between said spline groove centerline and said second end is at least one and one-half times the distance between said spline groove centerline and said shoulder.

25. A pipe joint between a pipe and a coupling comprising:
    a cylindrical coupling member having an end portion with a pair of axially-spaced internal circumferential grooves therein and a coupling end;
    said internal grooves including an internal spline receiving groove and an internal sealing ring groove on the opposite side of said spline receiving groove from said coupling end;
    a transverse spline receiving opening through said coupling end portion in alignment with said internal spline receiving groove;
    a pipe having a spigot end portion received in said end portion of said coupling member;
    said spigot end portion having a circumferential external spline receiving groove aligned with said internal spline receiving groove in said coupling member;
    said internal spline receiving groove having a depth greater than the depth of said external spline receiving groove;
    a sealing ring received in said internal circumferential sealing ring groove and being in sealing engagement with said spigot end portion;
    a flexible spline received in said aligned internal and external spline receiving grooves through said spline receiving opening to inhibit relative longitudinal movement between said spigot end portion and said coupling member; and
    said spline being a wire rope.

26. The joint of claim 25 wherein said wire rope includes a plurality of strands, each strand having a plurality of individual wires.

27. A pipe joint between a pipe and a coupling comprising:
    a cylindrical coupling member having an end portion with a pair of axially-spaced internal circumferential grooves therein and a coupling end;
    said internal grooves including an internal spline receiving groove and an internal sealing ring groove on the opposite side of said spline receiving groove from said coupling end;
    a transverse spline receiving opening through said coupling end portion in alignment with said internal spline receiving groove;
    a pipe having a spigot end portion received in said end portion of said coupling member;
    said spigot end portion having a circumferential external spline receiving groove aligned with said internal spline receiving groove in said coupling member;
    said internal spline receiving groove having a depth greater than the depth of said external spline receiving groove;
    a sealing ring received in said internal circumferential sealing ring groove and being in sealing engagement with said spigot end portion;
    a flexible spline received in said aligned internal and external spline receiving grooves through said spline receiving opening to inhibit relative longitudinal movement between said spigot end portion and said coupling member; and
    said spline having at least one layer of helically wound metal wire.

28. A pipe joint between a pipe and a coupling comprising:
    a cylindrical coupling member having an end portion with a pair of axially-spaced internal circumferential grooves therein and a coupling end;
    said internal grooves including an internal spline receiving groove and an internal sealing ring groove on the opposite side of said spline receiving groove from said coupling end;
    a transverse spline receiving opening through said coupling end portion in alignment with said internal spline receiving groove;
    a pipe having a spigot end portion received in said end portion of said coupling member;
    said spigot end portion having a circumferential external spline receiving groove aligned with said internal spline receiving groove in said coupling member;
    said internal spline receiving groove having a depth greater than the depth of said external spline receiving groove;
    a sealing ring received in said internal circumferential sealing ring groove and being in sealing engagement with said spigot end portion;
    a flexible spline received in said aligned internal and external spline receiving grooves through said spline receiving opening to inhibit relative longitudinal movement between said spigot end portion and said coupling member; and
    said spline including a plurality of layers of helically wound metal wire.

29. A pipe joint between a pipe and a coupling comprising:
    a cylindrical coupling member having an end portion with a pair of axially-spaced internal circumferential grooves therein and a coupling end;
    said internal grooves including an internal spline receiving groove and an internal sealing ring groove on the opposite side of said spline receiving groove from said coupling end;
    a transverse spline receiving opening through said coupling end portion in alignment with said internal spline receiving groove;
    a pipe having a spigot end portion received in said end portion of said coupling member;

said spigot end portion having a circumferential external spline receiving groove aligned with said internal spline receiving groove in said coupling member;

said internal spline receiving groove having a depth greater than the depth of said external spline receiving groove;

a sealing ring received in said internal circumferential sealing ring groove and being in sealing engagement with said spigot end portion;

a flexible spline received in said aligned internal and external spline receiving grooves through said spline receiving opening to inhibit relative longitudinal movement between said spigot end portion and said coupling member; and said spline having a hollow core.

* * * * *